(12) United States Patent
Cheng et al.

(10) Patent No.: US 11,281,990 B2
(45) Date of Patent: Mar. 22, 2022

(54) MINING NON-LINEAR DEPENDENCIES VIA A NEIGHBORHOOD MIXTURE MODEL

(71) Applicant: NEC Laboratories America, Inc., Princeton, NJ (US)

(72) Inventors: Wei Cheng, Ny, NY (US); Haifeng Chen, West Windsor, NJ (US); Guofei Jiang, Princeton, NJ (US); Kai Zhang, Princeton, NJ (US)

(73) Assignee: NEC Corporation

( * ) Notice: Subject to any disclaimer, the term of this patent is extended or adjusted under 35 U.S.C. 154(b) by 1303 days.

(21) Appl. No.: 15/635,995

(22) Filed: Jun. 28, 2017

(65) Prior Publication Data

US 2018/0075370 A1 Mar. 15, 2018

Related U.S. Application Data (60) Provisional application No. 62/393,428, filed on Sep. 12, 2016, provisional application No. 62/385,451, filed on Sep. 9, 2016.

(51) Int. Cl.
| | | |
|---|---|---|
| *G06N 5/00* | (2006.01) | |
| *G06N 7/00* | (2006.01) | |
| *G06N 20/00* | (2019.01) | |

(52) U.S. Cl.
CPC ............ *G06N 20/00* (2019.01); *G06N 5/003* (2013.01); *G06N 7/005* (2013.01)

(58) Field of Classification Search
CPC ......... G06N 20/00; G06N 5/003; G06N 7/005
See application file for complete search history.

(56) References Cited

U.S. PATENT DOCUMENTS

| | | | | |
|---|---|---|---|---|
| 2009/0132446 A1* | 5/2009 | Milenova | .............. | G06F 16/284 706/12 |
| 2012/0310619 A1* | 12/2012 | McConaghy | ....... | G06F 30/3323 703/14 |
| 2015/0317282 A1* | 11/2015 | Avron | ..................... | G06F 17/16 702/181 |

OTHER PUBLICATIONS

Ying Sun, "Majorization-Minimization Algorithms in Signal Processing, Communications, and Machine Learning", Aug. 18, 2016, IEEE Transactions on Signal Processing, vol. 65, No. 3 (Year: 2016).*

Globerson et al., "Metric learning by collapsing classes," Advances in Neural Information Processing Systems. NIPS 2005 Proceedings of the 18th International Conference on Neural Information Processing Systems. Dec. 5-8, 2005. pp. 451-458.

(Continued)

*Primary Examiner* — Hal Schnee
(74) *Attorney, Agent, or Firm* — Joseph Kolodka (57) ABSTRACT

A computer-implemented method for simultaneous metric learning and variable selection in non-linear regression is presented. The computer-implemented method includes introducing a dataset and a target variable, creating a univariate neighborhood probability map for each reference point of the dataset, and determining a pairwise distance between each reference point and other points within the dataset. The computer-implemented method further includes computing a Hessian matrix of a quadratic programming (QP) problem, performing optimization of the QP problem, re-weighing data derived from the optimization of the QP problem, and performing non-linear regression on the re-weighed data.

20 Claims, 4 Drawing Sheets

(56) References Cited

OTHER PUBLICATIONS

Takeuchi et al, "Target neighbor consistent feature weighting for nearest neighbor classification," Advances in Meural Information Processing Systems. NIPS 2011 Proceedings of the 24th International Conference on Neural Information Processing Systems. Dec. 12-15, 2011. pp. 576-584.
Tenenbaum et al., "A global geometric framework for nonlinear dimensionality reduction," Science. vol. 290, Issue 5500. Dec. 22, 2000. pp. 2319-2323.
Wang et al., "Parametric local metric learning for nearest neighbor classification," Proceedings of Neural Information Processing Systems, Advances in Neural Information Processing Systems. NIPS 2012 Proceedings of the 25th International Conference on Neural Information Processing Systems. Dec. 3-6, 2012. pp. 1610-1618.
Davis et al., "Information-theoretic metric learning," Proceedings of the 24th International Conference on Machine Learning. Jun. 20-24, 2007. pp. 209-216.
Weinberger et al., "Metric learning for kernel regression," Proceedings of the 11th International Conference on Artificial Intelligence and Statistics. Mar. 21-24, 2007. pp. 543-548.
Weinberger et al., "Distance metric learning for large margin nearest neighbor classification." Journal of Machine Learning Research. Feb. 2009. pp. 207-244.
Kira, et al., "A practical approach to feature selection," Proceedings of the 9th International Conference on Machine Learning. Jul. 12-16, 1992. pp. 249-256.

\* cited by examiner

MINING NON-LINEAR DEPENDENCIES VIA A NEIGHBORHOOD MIXTURE MODEL

RELATED APPLICATION INFORMATION

This application claims priority to Provisional Application No. 62/385,451, filed on Sep. 9, 2016, and Provisional Application No. 62/393,428, filed on Sep. 12, 2016, incorporated herein by reference in their entirety.

BACKGROUND

Technical Field

The present invention relates to machine learning and data mining and, more particularly, to mining non-linear dependencies via a neighborhood mixture model.

Description of the Related Art

Mining non-linear dependencies between variables is an issue that has drawn interest in statistics and machine learning. In the case when only two variables are considered, information-theoretic measures, such as mutual information is used. In the case when multi-variate data is used, estimating the mutual information can be a challenging issue. However, metric learning is a powerful tool in selecting the right distance criteria for non-linear classification problems.

SUMMARY

A computer-implemented method for simultaneous metric learning and variable selection in non-linear regression is presented. The method includes introducing a dataset and a target variable, creating a univariate neighborhood probability map for each reference point of the dataset, and determining a pairwise distance between each reference point and other points within the dataset. The method further includes, based on determined pairwise distances, computing a Hessian matrix of a quadratic programming (QP) problem, performing optimization of the QP problem, re-weighing data derived from the optimization of the QP problem, and performing non-linear regression on the re-weighed data.

A system for simultaneous metric learning and variable selection in non-linear regression is presented. The system includes a memory and a processor in communication with the memory, wherein the processor is configured to introduce a dataset and a target variable, create a univariate neighborhood probability map for each reference point of the dataset, determine a pairwise distance between each reference point and other points within the dataset, based on determined pairwise distances, compute a Hessian matrix of a quadratic programming (QP) problem, perform optimization of the QP problem, re-weigh data derived from the optimization of the QP problem, and perform non-linear regression on the re-weighed data.

A non-transitory computer-readable storage medium including a computer-readable program for simultaneous metric learning and variable selection in non-linear regression is presented, wherein the computer-readable program when executed on a computer causes the computer to perform the steps of introducing a dataset and a target variable, creating a univariate neighborhood probability map for each reference point of the dataset, and determining a pairwise distance between each reference point and other points within the dataset. The non-transitory computer-readable storage medium further includes, based on determined pairwise distances, computing a Hessian matrix of a quadratic programming (QP) problem, performing optimization of the QP problem, re-weighing data derived from the optimization of the QP problem, and performing non-linear regression on the re-weighed data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Non-linear variable dependencies are ubiquitous in real-world data and identifying non-linear relationships between a set of input variables to a target variable is a fundamental issue in statistics, machine learning, and data mining problems. Metric learning is a useful tool to identify relevant features in non-linear models.

In the exemplary embodiments of the present invention, a neighborhood mixture model (NMM) is used. One advantage of NMM is that it can simultaneously determine the right choice of a local neighborhood and learn the metric parameters. As a result, local geometric constraints can be enforced selectively on an optimized neighborhood. On the other hand, unlike in classification problems where the target variable only takes discreet values, the NMM provides special consideration in correlating input variables to a continuous target variable. The NMM approach can be used to improve performance on a great variety of non-linear predictors, and at the same time serve as an effective non-linear feature/variable selector.

The exemplary embodiments of the present invention consider simultaneous metric learning and feature/variable selection in non-linear regression. Given a data set $X \in R^{N \times D}$ and a target variable $y \in R^{N \times 1}$ (which can be continuous), the systems and methods are interested in learning an optimal non-negative scaling for each feature/variable, denoted by $w \in R^{d \times 1}$, such that a non-linear model is obtained that provides more accurate prediction when trained on the re-scaled data. In case of high-dimensional problems, a sparse metric w can identify features with high information content in terms of predicting the target variable, thus naturally performing feature/variable selection as well.

Learning a good metric and selecting the right features/variables for non-linear regression can be quite challenging for several reasons. First, features in non-linear models are tightly coupled, and so it becomes difficult to separate their contributions in predicting the target. Second, regression problems typically have a continuous target variable, which is much more complicated than discrete class labels. Third, a fundamental difficulty in metric learning is that local geometric structures of the data and the optimal metric are dependent on each other. Therefore, finding the right neighborhood to enforce local geometric constraints and compute the optimal metric becomes difficult before the optimal metric is known. In case of a continuous target, the choice of local neighbors can be more sensitive and sophisticated.

In accordance with the exemplary embodiments of the present invention, a neighborhood mixture model (NMM) is used for feature/variable selection and re-weighting in non-linear models. Instead of being bonded with a specific regressor, the objective of the NMM is to use general criteria that measure an intrinsical learnability of a target based on input features/variables. Therefore, the NMM can be used to improve performance on a great variety of non-linear predictors (e.g., support vector regression, Gaussian process regression, Nadaraya-Watson kernel regression, knn classifier, etc.).

In accordance with the exemplary embodiments of the present invention, the proposed methods and systems can be used to identify a small number of relevant variables to the target from potentially a large number of input features, in a highly non-linear manner. This allows the creation of a more accurate structural map of big physical systems, where there exists a large number of components and understanding the relation between the components is important to understand status of the system.

Figure 1:
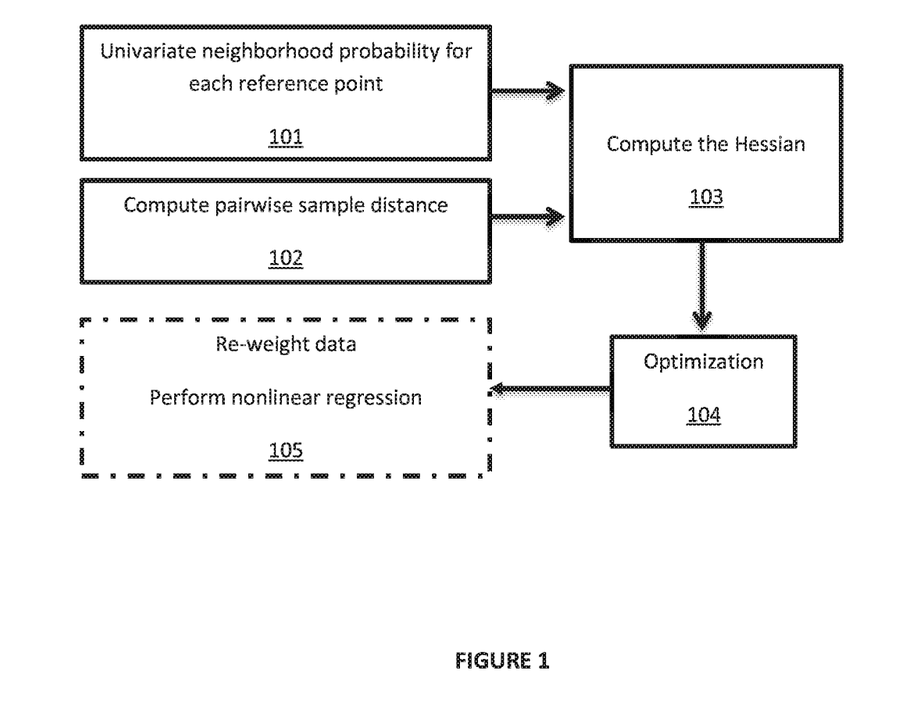
FIG. 1 is a block/flow diagram illustrating simultaneous metric learning and variable selection in non-linear regression, in accordance with embodiments of the present invention.

FIG. 1 depicts modules 101, 102, 103, 104, and 105. Module 101 is a univariate probability map module, module 102 is a pairwise sample distance module, module 103 is a Hessian computation module, module 104 is an optimization module, and module 105 is a data re-weighing and non-linear regression performance module.

Regarding module 101, a univariate probability map is created or built for each reference point of a dataset.

Mathematically, suppose a neighborhood probability matrix is defined for each (reference) sample $x_i$, as $P^{(i)} \in R^{N \times D}$. The jd-th entry in this matrix is the probability that sample $x_d$ falls into the k-nearest neighbors of the reference point $x_i$ along the dth dimension, for example:

$$P_{jd}^{(i)} = \frac{1}{2\sqrt{h_{id}}} \exp\left(-\frac{(x_{i[d]} - x_{j[d]})^2}{h_{id}}\right).$$

Here $h_{id}$ is a width of a Gaussian function for the ith reference point and dth dimension. Empirically, it is determined by a distance of the actual kth-nearest neighbors of a reference sample $x_i$ along the dth dimension. The matrices $P^{(i)}$'s are typically sparse by considering a reasonably small k.

Regarding module 102, a pairwise sample distance is computed.

In this step, the pairwise sample distance is computed and organized in the following manner:

$$|x_i - x_j|_\odot^q = [|x_{i[1]} - x_{j[1]}|^q, |x_{i[2]} - x_{j[2]}|^q, \ldots, |x_{i[d]} - x_{j[d]}|^q]^T.$$

Namely for each reference point $x_i$, a record of the distance of all other points $x_j$ to $x_i$ is kept across each dimension of the data set.

Regarding module 103, the Hessian matrix of the quadratic programming (QP) problem is computed.

Based on the results in modules 101 and 102, the following QP problem is arrived at:

$$\min_w w^T Q_k w - w^T Q_d w + \lambda \|w\|^2$$
$$st \; w^T 1 = 1, \text{ and } w \geq 0.$$

Here, Qk and Qd are defined as follows:

$$Q_k = \Sigma_{ij} P_{ij} \mu_{ij}^T, \; Q_d = \Sigma_{ij} \mu_{ij} P_{ij}^T,$$

This is a standard QP problem with an indefinite Hessian matrix Q.

Regarding module 104, optimization on non-convex QP is performed.

In order to solve the non-convex QP problem defined in module 104, a concave-convex procedure is used. The concave-convex procedure (CCCP) is a majorization-minimization algorithm that is used in solving a difference of convex programming programs of the form:

$$\min_x f(x) - g(x)$$
$$\text{s.t. } c_i(x) \leq 0, i = 1, 2, \ldots$$
$$d_j(x) = 0, j = 1, 2, \ldots$$

Here f(x), g(x), and $c_i$ are real-valued convex functions, and $d_j$'s can be an affine function. The CCCP algorithm is an iterative procedure that solves the following sequence of convex program:

$$x^{(t-1)} \in \mathrm{argmin}_x f(x) - x^T g(x^t)$$
$$\text{s.t. } c_i(x) \leq 0, i = 1, 2, \ldots$$
$$d_j(x) = 0, j = 1, 2, \ldots$$

Regarding module 105, that data is re-weighted and non-linear regression is performed. In this step, a re-weighting vector w can be used to obtain from the module 104 the re-weighted features/variables, and then perform non-linear regression, such as Gaussian process regression, or support vector regression.

Enforcing geometric constraints is a useful mechanism for metric learning. In a classification setting, samples belonging to the same class should be close to each other. On the other hand, samples from different classes should be pushed apart as much as possible. The intra-class compactness and inter-class separability is desirable in improving generalization performance of predictors. In practice, enforcing geometric constraint on all possible pairs of samples can be infeasible and computationally expensive. For example, when individual class distribution exhibits complex multi-modal shapes, enforcing global intra-class compactness and inter-class separability contradict with each other, thus making optimization infeasible. In certain circumstances, it is believed that local geometric constraints can be more feasible than considering all possible pairwise constraints, which leads to greater adaptability to heterogeneous local distributions.

However, the definition of "locality" (close neighbors) depends in turn on an ideal metric. Therefore, it is difficult to choose the right subset of samples to enforce geometric constraints before the optimal metric is known. Existing methods typically choose approximate neighbors based on the original data, which may correspond to a poor metric in particular when there exists a large number of irrelevant features. Another challenge is that in non-linear models, features/variables are coupled tightly with each other, thus making it particularly difficult to perform feature/variable selection. In using a kernel matrix as a non-linear dependency measure, similar challenges exist and a greedy backward elimination scheme has to be adopted.

In the following, a neighborhood mixture model (NMM) is used to solve such challenges. For example:

Suppose a non-negative re-scaling factor $w \in R^d$ on the input data X is desired to be learned. The basic idea of the NMM is as follows: given a reference point, a probability for x to be close neighbors of the reference point in the re-scaled, d-dimensional Euclidean space, can be modelled as a mixture of the probabilities that x belong to the close neighbors of the reference point along each individual dimension, and a mixing weight is exactly the re-scaling factor w.

Mathematically, a neighborhood probability matrix can be defined for each (reference) sample $x_i$, as $P^{(i)} \in R^{N \times D}$. The jd-th entry in this matrix is the probability that sample $x_j$ falls into the k-nearest neighbors of the reference point $x_i$ along the dth dimension, for example:

$$P_{jd}^{(i)} = \frac{1}{2\sqrt{h_{id}}} \exp\left(-\frac{(x_{i[d]} - x_{j[d]})^2}{h_{id}}\right). \quad (1)$$

Here $h_{id}$ is a width of a Gaussian function for the ith reference point and dth dimension. Empirically, it is determined by a distance of the actual kth-nearest neighbors of the reference sample $x_i$ along the dth dimension. The matrices $P^{(i)}$'s are typically sparse by considering a reasonably small k. Then the probability of sample $x_j$ can be written to be the close neighbors of the reference sample $x_i$ in the w-rescaled metric space, as:

$$p(x_j | x_i) = P_{[j,:]}^{(i)} \cdot w. \quad (2)$$

$$= p_{ij}^\top w \quad (3)$$

Here $P_{[j,:]}^{(i)}$ denotes the jth row in the matrix $P^i$, and for notational simplicity $P_{ij} = (P_{[j,:]}^{(i)})^T$ is used. In other words, the importance of different dimensions in shaping the nearest neighbors of $x_i$ in the re-scaled multi-dimensional space is determined by the re-scaling vector w. Note that w is required to be non-negative and unit $l_1$-norm.

As can be seen, the neighborhood probability along each individual dimension does not vary with the re-scaling metric w. Therefore, they serve conveniently as a basis for modelling the neighborhood probability in the multi-dimensional space, using w as weights. In other words, the neighborhood probabilities p(xi|xj) are exactly parameterized by the metric w, which indicates that the choice of the neighborhood and the learning of the right metric can be simultaneously optimized.

Next the target information is incorporated in learning the metric w. A commonly used criteria in metric learning for classification is that (1) if $y_i$ and $y_j$ are sufficiently close to each other, then the corresponding samples $x_i$ and $x_j$ should also be close to each other; (2) if $y_i$ and $y_j$ are very different, then the corresponding samples $x_i$ and $x_j$ should also be pushed apart. Actually, these conditions measure the intrinsic learnability of the target y given input samples $x_i$'s, regardless of the regressor adopted.

In the following, such criterion is extended to regression settings, while simultaneously taking into account the locality in enforcing geometric constraints.

For notational convenience, the following is defined:

$$|x_i - x_j|_\odot^q = [|x_{i[1]} - x_{j[1]}|^q, |x_{i[2]} - x_{j[2]}|^q, \ldots, |x_{i[d]} - x_{j[d]}|^q]^T$$

First, samples of similar target values are made close to each other. In order to achieve this and to simultaneously take into account only local neighbors, the following objective function is used:

$$\underset{w}{\text{minimize}} \sum_i \sum_j p(x_i | x_j)(w^\top |x_i - x_j|_\odot^q) K_{ij}$$

Here $K_{ij}$ is the similarity between $y_i$ and $y_j$, which can be computed by, say, a Gaussian kernel with a proper bandwidth. In this objective, only when $x_i$ and $x_j$ have a high chance to be close neighbors (namely p(xj|xi) is large), and $y_i$ and $y_j$ are close to each other (namely $K_{ij}$ is large), push $wx_i$ and $wx_j$ to be close to each other and all other pairs of geometry constraints are given minute considerations. Namely, the geometry constraints are spatially local.

In practice it would also be useful to push apart samples whose corresponding target values are very different from each other. The following objective function can be maximized:

$$\underset{w}{\max} \sum_i \sum_j p(x_i | x_j)(w^\top |x_i - x_j|_\odot^q) D_{ij}$$

It can be understood as maximizing a correlation between a pairwise sample distance $w^T |x_i - x_j|_\odot^q$ and pairwise target value distance $D_{ij}$, and those pairs with higher probability p(xi|xj) of being close neighbors is given higher weight in contributing to the correlation. As a result, neighboring sample pairs whose target values differ significantly with each other are pushed further apart in the new metric space.

The two objectives (objective functions) are put together in a minimization problem.

By defining $\mu_{ij} = |x_i - x_j|_\odot^q$:

$$\sum_i \sum_j p(x_i|x_j)(w^\top|x_i - x_j|_\odot^q) K_{ij} - \sum_i \sum_j p(x_i|x_j)(w^\top|x_i - x_j|_\odot^q) D_{ij} =$$

$$w^\top \left( \sum_{ij} p_{ij} \mu_{ij}^\top \cdot (K_{ij} - D_{ij}) \right) w$$

By defining:

$$Q_k = \Sigma_{ij} P_{ij} \mu_{ij}^T, \text{ and } Q_d = \Sigma_{ij} \mu_{ij} P_{ij}^T$$

Thus, the following quadratic programming problem is presented:

$$\underset{w}{\min} \ w^\top Q_k w - w^\top Q_d w + \lambda \|w\|^2 \quad (4)$$

$$st \ w^T 1 = 1, \text{ and } w \geq 0.$$

An $l_2$-norm regularization of w is added to penalize the model complexity. Due to the asymmetric compositions of nearest neighbors, the matrices Qk and Qd are symmetrized by adding them with their respective transposes.

The Hessian matrix in (4) can have both positive and negative eigenvalues, making the problem a non-convex optimization problem. In the following, the objective function is decomposed into the differences between convex components, and the convex-concave procedure is adopted to obtain the solution.

Definition 1. The concave-convex procedure (CCCP) is a majorization-minimization algorithm that is used in solving the difference of convex programming programs of the form:

$$\min_x f(x) - g(x)$$
$$\text{s.t. } c_i(x) \le 0, i = 1, 2, \ldots$$
$$d_j(x) = 0, j = 1, 2, \ldots$$

Here f(x), g(x), and $c_i$ are real-valued convex functions, and $d_j$'s can be affine functions. The CCCP algorithm is an iterative procedure that solves the following sequence of convex program:

$$x^{(t-1)} \in \text{argmin}_x f(x) - x^\top g(x^t)$$
$$\text{s.t. } c_i(x) \le 0, i = 1, 2, \ldots$$
$$d_j(x) = 0, j = 1, 2, \ldots$$

As can be seen from (2), the idea of CCCP is to linearize the concave part of which is around a solution obtained in the current iteration so that it is convex in x, and therefore the non-convex program in (1) is solved as a sequence of convex programs as shown in (2). The original formulation of CCCP deals with unconstrained and linearly constrained problems. However, the same formulation can be extended to handle any constraints (both convex and non-convex).

More specifically, let the eigenvalue decomposition of the matrix Qk be:

$$Q_k - Q_d = \sum_{k=1}^D \sigma_k v_k v_k^\top$$
$$= \sum_{\sigma_k \ge 0} \sigma_k v_k v_k^\top - \sum_{\sigma_k < 0} |\sigma_k| v_k v_k^\top$$
$$= Q^+ - Q^-$$

Here Q+ and Q− are both psd matrices, which corresponds to the positive and negative components of Qk.

So the objective can be deemed as a difference of convex functions:

$$\min_w f(w) - g(w) \quad (5)$$
$$st \ f(w) = w^\top Q^+ w$$

$$g(w) = w^\top Q^- w$$
$$w^T 1 = 1, \text{ and } w \ge 0$$

The DC-programming can iteratively minimize a difference between two convex functions. Given an initial solution w(t), the basic idea is to locate the next solution w(t+1) by solving the following problem:

$$\nabla_w^T f(w_t) = \nabla_w (w_{t+1}). \quad (6)$$

By considering the specific form of the convex functions and the constraints, the following problem in each iteration is presented:

$$\min_w w Q^+ w - 2Q^- w \quad (7)$$
$$\text{s.t. } w^T 1 = 1, \text{ and } w \ge 0 \quad (8)$$

This is a standard QP problem which can be solved efficiently using existing solvers.

In case dimensionality of input data is very high, a sparse metric w can be obtained such that only relevant features get non-zero scaling factor. To enforce a sparsity constraint on solution w, the original equality-norm constraint becomes problematic. An $l_2$-norm constraint $\|w\|_2 = 1$ instead of $|w| = 1$ is thus used.

Note that the unit-norm constraint $w^T w = 1$ is a specific example of the Riemannian manifold. Therefore, such geometric structure of the constraint can be used. In the following, a projected gradient method is used that is guaranteed to find a sequence of solutions that converges to a local optimal solution.

1. Given a feasible solution $w^{(t)}$
2. Compute a gradient $g^{(t)} = 2Qw + b^T w$
3. Project the gradient to a tangent subspace by:
$$h^{(t)} = g^{(t)} - \langle g^{(t)}, w^{(t)} \rangle \cdot w^{(t)}$$
4. Normalize $h^{(t)} = h^{(t)} / \|h^{(t)}\|$
5. Uniformly pick θ from [0,2π];
compute an objective function $f(w^{(t)} \cos(\theta) + h^{(t)} \sin(\theta))$
6. Pick a feasible θ with a minimum objective value, and then let $w^{(t+1)} = w^{(t)} \cos(\theta) + h^{(t)} \sin(\theta)$ and go to step 2.

Next, $w^{(t+1)}$ is proved to be a feasible solution that can monotonically decrease the objective function along a tangent direction. First, note that:

$$\|w^{(t+1)}\| = \|w^{(t)} \cos(\theta) + h^{(t)} \sin(\theta)\|$$
$$= \cos(\theta)^2 \|w^{(t)}\|^2 + \|h^{(t)}\|^2 \sin(\theta)^2 +$$
$$2\langle w^{(t)}, h^{(t)} \rangle \sin(\theta) \cos(\theta)$$
$$= 1$$

By noting that $\|w^{(t)}\| = \|h^{(t)}\| = 1$ and $\langle w^{(t)}, h^{(t)} \rangle = 0$.

In other words, by picking θ in [0,2π], all feasible solutions are uniformly examined in a parametric space. In the meantime, the θ that leads to a feasible w(t) is picked with a minimum objective. By doing this, each iteration is guaranteed to reduce the objective, and as a result it converges to a locally optimal solution since the objective function is finite.

Computing Qk and Qd requires sequentially going through every sample point as the reference point, and computing the probability matrix P across each dimension.

This takes altogether $O(d^2n)$ time and $O(d^2)$ space. Separating the components with positive and negative eigenvalues requires eigenvalue decomposition of the matrix $Qk-Qd$, which takes $O(d^3)$ time and $O(d^2)$ space. The optimization step takes $O(d^2T)$ time and $O(d^2)$ space, where T is the number of iterations needed. Overall, the algorithm has a time complexity that is linear with sample size and cubic with dimensionality.

One advantage of the NMM approach is that the neighborhood structure is optimized simultaneously with the metric parameter. In comparison, existing approaches either choose the neighbors using original data whose metric can be very poor or by simply taking into account all the pairwise relations. Second, most of the existing approaches are bonded with a specific model. For example, a first existing approach explicitly considers the kernel regression as the prediction model and a second existing approach considers the least-square loss function in which a target variable Y (or its transform) is explicitly reconstructed by transformed input variables.

In comparison, in the NMM, the objective function is not restricted to any specific predictors or loss function. Instead, the intrinsic "learnality" of the target variable is measured from input variables via a localized alignment measure, and therefore it can be used to improve the performance of a great variety of non-linear predictors. Finally, the metric learned in the NMM approach is directly applicable to a second-round non-linear classifier.

Figure 2:
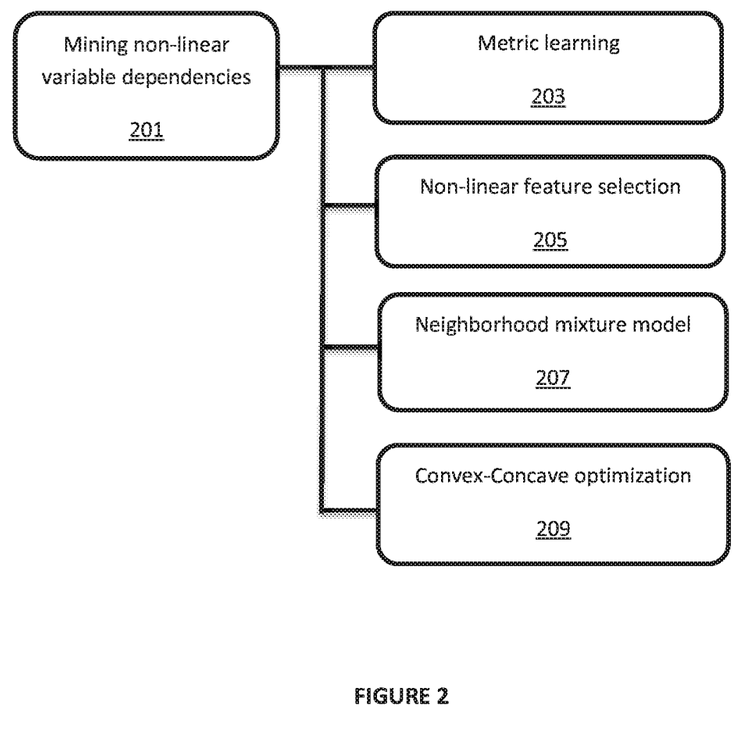
FIG. 2 is a block/flow diagram of mining non-linear variable dependencies, in accordance with embodiments of the present invention.

FIG. 2 is a block/flow diagram of mining non-linear variable dependencies 201, in accordance with embodiments of the present invention. The mining includes metric learning 203, non-linear feature/variable selection 205, a neighborhood mixture model (NMM) 207, and convex-concave optimization 209.

Figure 3:
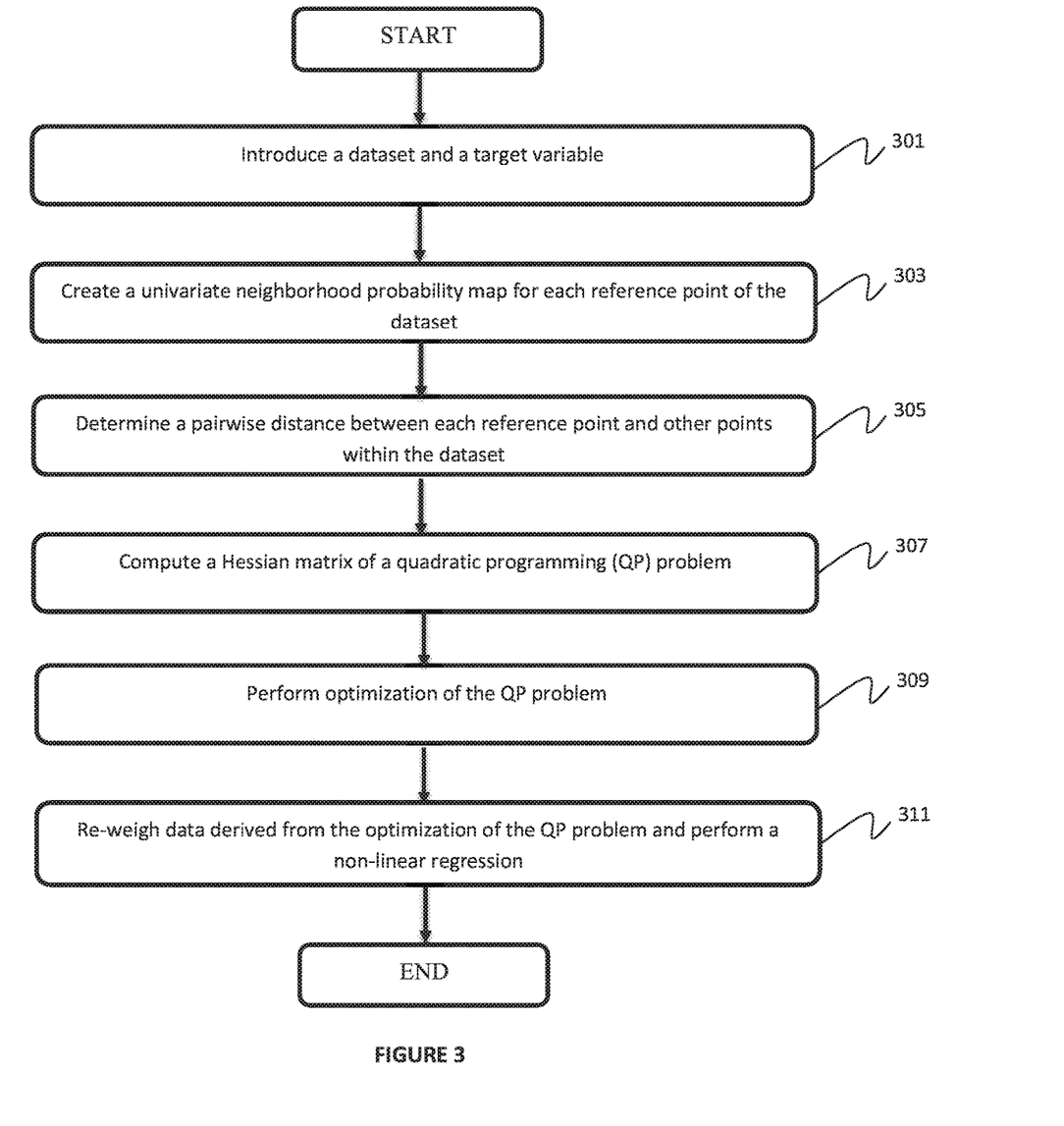
FIG. 3 is a block/flow diagram of a method for simultaneous metric learning and variable selection in non-linear regression, in accordance with embodiments of the present invention.

FIG. 3 is a block/flow diagram of a method for simultaneous metric learning and variable selection in non-linear regression, in accordance with embodiments of the present invention.

At block 301, a dataset and a target variable are introduced.

At block 303, a univariate probability map is created for each reference point of the dataset.

At block 305, a pairwise distance is determined between each reference point and other points within the dataset.

At block 307, a Hessian matrix of a quadratic programming (QP) problem is computed.

At block 309, optimization of the QP problem is performed.

At block 311, data derived from the optimization of the QP problem is re-weighed and non-linear regression on the re-weighed data is performed.

In summary, the exemplary embodiments of the present invention present a neighborhood mixture model (NMM) to solve the problem of metric learning in non-linear models. One advantage of NMM is that it can simultaneously determine the right choice of the local neighborhood and the learning of the metric parameters. As a result, local geometric constraints can be enforced selectively on an optimized neighborhood. The NMM approach can be used to improve the performance on a great variety of non-linear predictors, and at the same time serve as a highly effective non-linear feature/variable selector. Moreover, the NMM approach can simultaneously determine the right choice of the local neighborhood and the learning of the metric parameters. As a result, local geometric constraints can be enforced selectively on an optimized neighborhood. On the other hand, unlike in classification problems where the target variable only takes discreet values, the NMM gives special consideration in correlating the input variables to a continuous target variable. The NMM can be used to identify intrinsical non-linear relations between input variables and the target variable using generic criteria that measure the learnability from the input variable to the output variable. Thus, the NMM allows the enforcement of geometric constraint much more accurately than existing approaches. The NMM can find more accurate non-linear relations between variables, which provides a better view of systems in terms of their structural organization.

Figure 4:
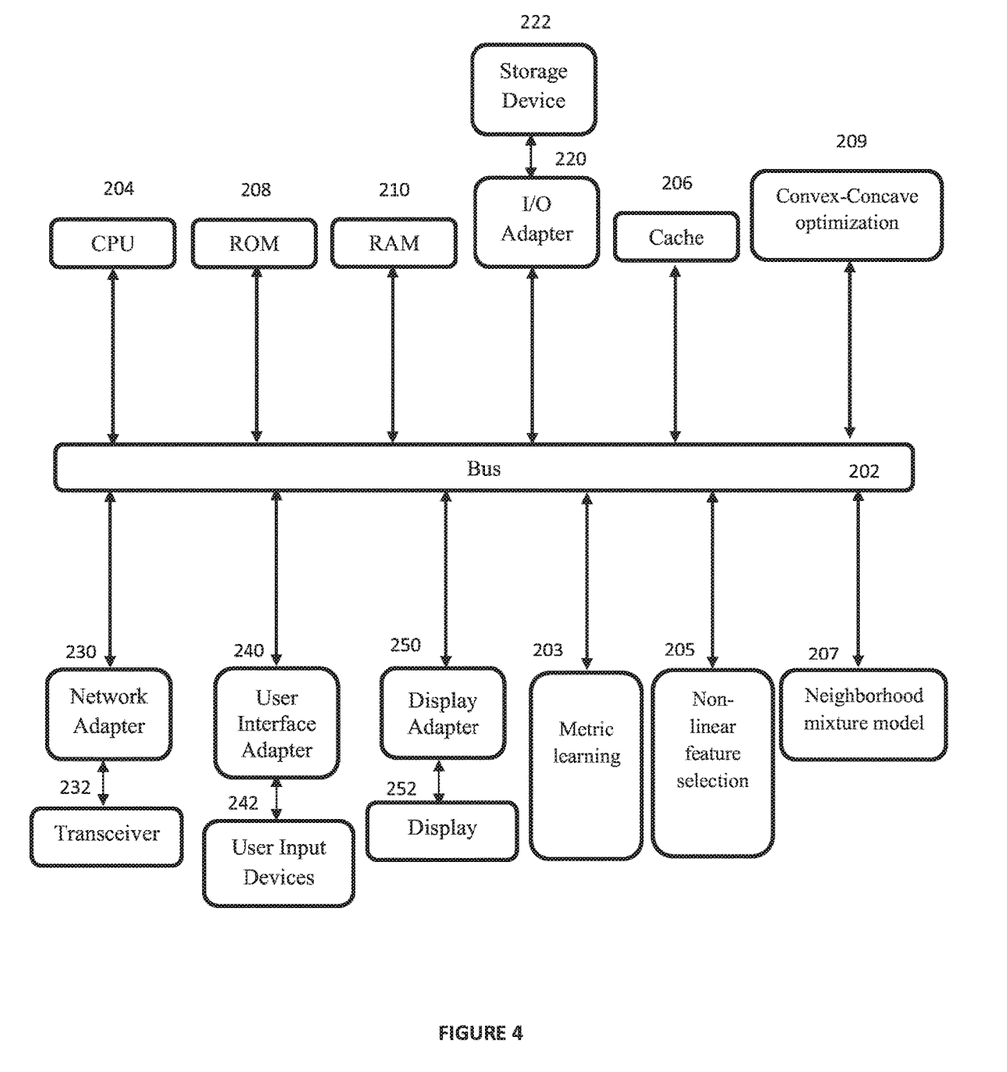
FIG. 4 is an exemplary processing system for mining non-linear dependencies via a neighborhood mixture model, in accordance with embodiments of the present invention.

FIG. 4 is an exemplary processing system for mining non-linear dependencies via a neighborhood mixture model, in accordance with embodiments of the present invention.

The processing system includes at least one processor (CPU) 204 operatively coupled to other components via a system bus 202. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 202. Additionally, a metric learning module 202, a non-lineal feature selection module 203, a neighborhood mixture module 204, and a convex-concave optimization module 205 are operatively coupled to the system bus 202.

A storage device 222 is operatively coupled to system bus 202 by the I/O adapter 220. The storage device 222 can be any of a disk storage device (e.g., a magnetic or optical disk storage device), a solid state magnetic device, and so forth.

A transceiver 232 is operatively coupled to system bus 202 by network adapter 230.

User input devices 242 are operatively coupled to system bus 202 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the NMM processing system.

A display device 252 is operatively coupled to system bus 202 by display adapter 250.

Of course, the NMM processing system may also include other elements (not shown), as readily contemplated by one of skill in the art, as well as omit certain elements. For example, various other input devices and/or output devices can be included in the NMM system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the NMM processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor of a computer for simultaneous metric learning and variable selection in non-linear regression, the method comprising:
   introducing a dataset having a plurality of input variables and a target variable;

learning a non-negative re-scaling factor from the plurality of input variables;
building a univariate neighborhood probability map for each reference point of the dataset by defining a neighborhood probability matrix for a neighborhood mixture model;
determining a pairwise distance between each reference point and other points within the dataset;
based on determined pairwise distances, computing a Hessian matrix of a quadratic programming (QP) problem;
performing optimization of the QP problem, the optimization being a concave-convex optimization;
re-weighing features derived from the optimization of the QP problem; and
performing non-linear regression on the re-weighed data to generate a structural map laying out a structural organization of identified non-linear relationships between the plurality of input variables and the target variable by employing the neighborhood mixture model which approximates multivariate close neighbors with a mixture of neighborhood probability across each individual dimension,
wherein the identified non-linear relationships are extracted only from a subset of relevant input variables of the plurality of input variables to reduce a number of computations of the QP problem to improve functionality of the computer running the simultaneous metric learning and variable selection and to increase accuracy of the generated structural map.

2. The method of claim 1, wherein the neighborhood probability matrix is given by:

$$P_{jd}^{(i)} = \frac{1}{2\sqrt{h_{id}}} \exp\left(-\frac{(x_{i[d]} - x_{j[d]})^2}{h_{id}}\right)$$

where $h_{id}$ is a width of a Gaussian function for the ith reference point and $d^{th}$ dimension, and $x_i$, $x_j$ are reference samples in the $d^{th}$ dimension.

3. The method of claim 1, wherein the pairwise distance is given by:

$$|x_i - x_j|_\odot^q = [|x_{i[1]} - x_{j[1]}|^q, |x_{i[2]} - x_{j[2]}|^q, \ldots, |x_{i[d]} - x_{j[d]}|^q]^T$$

where $x_i$, $x_j$ are reference samples, T denotes transpose to a row vector, and q denotes a dimensional vector of non-negative weights.

4. The method of claim 1, wherein local geometric constraints are selectively enforced on an optimized neighborhood.

5. The method of claim 1, wherein the non-linear relationships between the plurality of input variables and the target variable are identified by using generic criteria that measure learnability from an input variable of the plurality of input variables to an output variable.

6. The method of claim 1, wherein re-weighing the data allows for learning an optimal non-negative scaling for each variable in the dataset.

7. The method of claim 1, wherein a neighborhood structure is optimized simultaneously with a metric parameter.

8. A system for simultaneous metric learning and variable selection in non-linear regression, the system comprising:
a memory; and
a processor in communication with the memory, wherein the processor is configured to:
introduce a dataset having a plurality of input variables and a target variable;
learn a non-negative re-scaling factor from the plurality of input variables;
build a univariate neighborhood probability map for each reference point of the dataset by defining a neighborhood probability matrix for a neighborhood mixture model;
determine a pairwise distance between each reference point and other points within the dataset;
based on determined pairwise distances, compute a Hessian matrix of a quadratic programming (QP) problem;
perform optimization of the QP problem, the optimization being a concave-convex optimization;
re-weigh features derived from the optimization of the QP problem; and
perform non-linear regression on the re-weighed data to generate a structural map laying out a structural organization of identified non-linear relationships between the plurality of input variables and the target variable by employing the neighborhood mixture model which approximates multivariate close neighbors with a mixture of neighborhood probability across each individual dimension,
wherein the identified non-linear relationships are extracted only from a subset of relevant input variables of the plurality of input variables to reduce a number of computations of the QP problem to improve functionality of a computer running the simultaneous metric learning and variable selection and to increase accuracy of the generated structural map.

9. The system of claim 8, wherein the neighborhood probability matrix is given by:

$$P_{jd}^{(i)} = \frac{1}{2\sqrt{h_{id}}} \exp\left(-\frac{(x_{i[d]} - x_{j[d]})^2}{h_{id}}\right)$$

where $h_{id}$ is a width of a Gaussian function for the ith reference point and $d^{th}$ dimension, and $x_i$, $x_j$ are reference samples in the $d^{th}$ dimension.

10. The system of claim 8, the pairwise distance is given by:

$$|x_i - x_j|_\odot^q = [|x_{i[1]} - x_{j[1]}|^q, |x_{i[2]} - x_{j[2]}|^q, \ldots, |x_{i[d]} - x_{j[d]}|^q]^T$$

where $x_i$, $x_j$ are reference samples, T denotes transpose to a row vector, and q denotes a dimensional vector of non-negative weights.

11. The system of claim 8, wherein local geometric constraints are selectively enforced on an optimized neighborhood.

12. The system of claim 8, wherein the non-linear relationships between the plurality of input variables and the target variable are identified by using generic criteria that measure learnability from an input variable of the plurality of input variables to an output variable.

13. The system of claim 8, wherein re-weighing the data allows for learning an optimal non-negative scaling for each variable in the dataset.

14. The system of claim 8, wherein a neighborhood structure is optimized simultaneously with a metric parameter.

15. A non-transitory computer-readable storage medium comprising a computer-readable program for simultaneous metric learning and variable selection in non-linear regression, wherein the computer-readable program when executed on a computer causes the computer to perform the steps of:
- introducing a dataset having a plurality of input variables and a target variable;
- learning a non-negative re-scaling factor from the plurality of input variables;
- building a univariate neighborhood probability map for each reference point of the dataset by defining a neighborhood probability matrix for a neighborhood mixture model;
- determining a pairwise distance between each reference point and other points within the dataset;
- based on determined pairwise distances, computing a Hessian matrix of a quadratic programming (QP) problem;
- performing optimization of the QP problem, the optimization being a concave-convex optimization;
- re-weighing features derived from the optimization of the QP problem; and
- performing non-linear regression on the re-weighed data to generate a structural map laying out a structural organization of identified non-linear relationships between the plurality of input variables and the target variable by employing the neighborhood mixture model which approximates multivariate close neighbors with a mixture of neighborhood probability across each individual dimension,
- wherein the identified non-linear relationships are extracted only from a subset of relevant input variables of the plurality of input variables to reduce a number of computations of the QP problem to improve functionality of the computer running the simultaneous metric learning and variable selection and to increase accuracy of the generated structural map.

16. The non-transitory computer-readable storage medium of claim 15, wherein the neighborhood probability matrix is given by:

$$P_{jd}^{(i)} = \frac{1}{2\sqrt{h_{id}}} \exp\left(-\frac{(x_{i[d]} - x_{j[d]})^2}{h_{id}}\right)$$

where $h_{id}$ is a width of a Gaussian function for the ith reference point and $d^{th}$ dimension, and $x_i$, $x_j$ are reference samples in the $d^{th}$ dimension.

17. The non-transitory computer-readable storage medium of claim 15, wherein the pairwise distance is given by:

$$|x_i - x_j|_\odot^q = [|x_{i[1]} - x_{j[1]}|^q, |x_{i[2]} - x_{j[2]}|^q, \ldots, |x_{i[d]} - x_{j[d]}|^q]^T$$

where $x_i$, $x_j$ are reference samples, T denotes transpose to a row vector, and q denotes a dimensional vector of non-negative weights.

18. The non-transitory computer-readable storage medium of claim 15, wherein local geometric constraints are selectively enforced on an optimized neighborhood.

19. The non-transitory computer-readable storage medium of claim 15, wherein the non-linear relationships between the plurality of input variables and the target variable are identified by using generic criteria that measure learnability from an input variable of the plurality of input variables to an output variable.

20. The non-transitory computer-readable storage medium of claim 15, wherein a neighborhood structure is optimized simultaneously with a metric parameter.

* * * * *